United States Patent [19]

Grimes

[11] Patent Number: 4,463,445
[45] Date of Patent: Jul. 31, 1984

[54] CIRCUITRY FOR ALLOCATING ACCESS TO A DEMAND-SHARED BUS

[75] Inventor: Gary J. Grimes, Thornton, Colo.

[73] Assignee: Bell Telephone Laboratories, Incorporated, Murray Hill, N.J.

[21] Appl. No.: 337,672

[22] Filed: Jan. 7, 1982

[51] Int. Cl.³ ............................................. G06F 13/00
[52] U.S. Cl. .................................................... 364/900
[58] Field of Search ................ 364/200, 900 MS File; 340/825.5, 825.51, 825.54

[56] References Cited

U.S. PATENT DOCUMENTS

| | | | |
|---|---|---|---|
| 3,796,992 | 3/1974 | Nakumura | 340/147 LP |
| 3,818,447 | 6/1974 | Craft | 340/147 LP |
| 3,983,540 | 9/1976 | Keller | 340/172.5 |
| 4,096,571 | 6/1978 | Vandermey | 364/200 |
| 4,209,840 | 6/1980 | Berardi | 364/200 |
| 4,281,380 | 7/1981 | DeMesa | 364/200 |
| 4,281,381 | 7/1981 | Ahuja | 364/200 |
| 4,320,452 | 3/1982 | Kempf | 364/200 |

Primary Examiner—Harvey E. Springborn
Assistant Examiner—David Y. Eng
Attorney, Agent, or Firm—Donald M. Duft

[57] ABSTRACT

Circuitry is disclosed for allocating requests for demand-shared bus access among a plurality of service requesting ports. During bus contention time, each requesting port synchronously and sequentially applies the digits of its assigned unique priority code to the bus beginning with the most significant digit. After the application of all digits, only the requesting port having the highest code remains in contention and it seizes the bus. A plurality of status flip-flops is provided in each port for generating port parameter bits. The generated parameter bits are applied to the bus as the most significant bits of a dynamic port priority code during contention time. However, the selective application of a mask signal to a mask conductor during contention time causes each requesting port to ignore any parameter bits on the bus as long as the mask signal remains. This returns control of the port preference to any unmasked parameter bits and to the assigned port priority codes.

17 Claims, 6 Drawing Figures

FIG. 6
ARBITRATION LOGIC

CIRCUITRY FOR ALLOCATING ACCESS TO A DEMAND-SHARED BUS

CROSS-REFERENCE TO RELATED APPLICATIONS

This application is related to the following concurrently filed applications:

J. O. Dimmick, Ser. No. 337,673, entitled "Circuitry for Allocating Access to a Demand-Shared Bus";

G. J. Grimes 3, Ser. No. 337,674, entitled "Circuitry for Allocating Access to a Demand-Shared Bus";

and G. J. Grimes 4, Ser. No. 337,868, entitled "Circuitry for Allocating Access to a Demand-Shared Bus."

TECHNICAL FIELD

This invention relates to a shared resource system and, more particularly, to apparatus for assigning access to the resource equitably among a plurality of requesting devices. More particularly, the invention relates to a packet switching system having an allocation facility for controlling access to a common bus by a plurality of requesting devices such as ports.

BACKGROUND OF THE INVENTION

Systems in which many devices share a common resource typically utilize arrangements for allocating access to the resource under conditions during which a plurality of associated devices may concurrently request access. Many different allocation arrangements are known in the art. In data processing and packet switching systems, it is known to use a centralized allocator or controller for allocating access to a common data bus interconnecting a plurality of units, such as ports, that may concurrently request access to the bus. The controller may be programmed with an appropriate algorithm to allocate bus access in accordance with any priorly determined criterion that may be desired. Although centralized controller allocation arrangements operate suitably to perform their intended function, they are not always desirable because of the inherent system complexity resulting from the many interconnections required between the controller, the bus, and the ports. Also, a reliability problem exists since a malfunction of the controller may remove the whole system from operation. A system having a centralized controller is shown by U.S. Pat. No. 3,983,540 issued Sept. 28, 1976 to Keller et al.

It is known to use distributed bus allocation arrangements in which a controller is not used to determine access and instead, the interaction of the requesting ports determines bus allocation in the event of simultaneous requests. Such distributed arrangements are often preferable since the expense of and the reliability problems associated wth the centralized controller arrangement are avoided.

In accordance with one such distributed allocation arrangement, each port that may request access to a common bus is assigned a fixed priority number comprising a plurality of binary digits. Access is granted by priority number in case of concurrent requests. During bus contention time, when two or more ports concurrently request access, each requesting port applies the corresponding bits of its priority number to an arbitration bus sequentially, bit by bit, in synchronism with the application of corresponding bits by all other concurrently requesting ports. As each bit is applied, each bidding port compares the magnitude of the bit it is currently applying with the logical union of the corresponding bits applied simultaneously to the arbitration bus by all concurrently requesting ports. If a bit one requesting port currently applies has a prescribed relationship (such as equal to or higher) to the bits applied to the bus by the other requesting ports, this operation proceeds and the port applies the next bit of its assigned priority number to the arbitration bus.

Each port stays in contention as long as each bit it applies has the prescribed relationship to the logical union of the corresponding bits currently applied by other contending ports. A port removes itself from contention when it determines that a bit it applies has a relationship (such as is lower than) to the bits applied by the other ports indicating that one or more of the other ports has a higher priority number. At that time, each port having a lower priority number removes itself from contention and applies no further bits to the bus.

This contention operation continues; the remaining bits of the port priority numbers are applied to the bus by all remaining requesting ports; ports of a lower priority remove themselves from contention; and at the end of the contention interval when the last bit is applied to the bus, only the port having the highest priority remains in contention and it is granted access to the bus. An arrangement of the above described type is shown in U.S. Pat. No. 3,796,992 issued Mar. 12, 1974, to Nakamura et al and in U.S. Pat. No. 3,818,447 issued June 18, 1974 to Craft.

The above described distributed contention arrangement operates satisfactory. However, it suffers from the disadvantage that the port priority numbers are fixed and, since port access is determined by these numbers, the ports may be considered to be functionally arranged in a fixed preference chain with the most preferred port having the highest priority number and the least preferred port having the lowest priority number. This being the case, access to the bus is not equitable since ports having the higher priority numbers are always favored in the event of simultaneous requests. While this unequitable allocation of ports may be tolerable in certain systems, it is a disadvantage in those systems in which more equitable access by all ports is required.

SUMMARY OF THE INVENTION

My invention is directed to a solution of the foregoing problems and limitations of the prior art. I provide an improved method and structure for allocating a demand-shared bus among one or more requesting units or ports each of which has a unique assigned priority number comprising a plurality of binary coded digits. Further, and in accordance with my invention, each port includes facilities for monitoring dynamically the current state of various operational port parameters and for generating corresponding port priority bits representing these parameters. These generated bits are used in conjunction with the assigned port priority number bits to determine bus access.

The port parameter bits generated by the facilities of my invention are entered into the more significant bit positions of a port shift register. The assigned port priority numbered bits are entered into the remainder of the shift register so as to be of lesser significance than the parameter bits. During bus contention times, the bits in the shift register of each requesting port are read out sequentially one at a time beginning with the most significant bit and applied to the arbitration bus.

During conditions in which no port parameter bits are generated by the facilities of my invention, the shift register contains 0's in the corresponding more significant bit positions and contains the regularly assigned port priority number bits in its lesser significant bit positions. Under such conditions, port priority is determined using only the assigned port priority number. However, during operational states of ports in which a 1 is generated for one or more of the parameter bits, these parameter bits are read out of the shift register ahead of the port priority number bits and thus will, by themselves, control bus access. If two or more ports have identical parameter bits set to a one, and there are no other ports having parameter bits indicating a higher priority, the port priority number bits are used to break the tie.

The facilities provided in accordance with my invention for monitoring port parameters and for generating corresponding parameter bits, for entry into the port's shift register, include facilities for monitoring the current contents of a packet buffer in each port to determine whether it is less than half-full, at least half full or full of packet information. These facilities can generate respectively, no bits, a buffer half-full bit, and a buffer full bit.

The facilities I provide for generating port parameter bits include snapshot facilities which ensure that all ports requesting service at a particular time are served ahead of later requesting ports. These snapshot facilities include a flip-flop which is set at a particular time, termed a snapshot time, in each port that is then requesting bus access. The setting of this flip-flop in each such port applies a snapshot bit of 1 to its associate shift register as a more significant bit ahead of the bits of the assigned port priority number. A snapshot flip-flop is reset as its port is granted bus access and at the end of a given number of contention cycles, all ports having their snapshot flip-flop set will have been served and their snapshot flip-flops will be in a reset state. A new snapshot time then occurs and the snapshot flip-flop in each then currently requesting port is set to define a new group of ports to be given preference.

As before, the corresponding shift register bits of each requesting port are applied concurrently to the arbitration bus during contention time sequentially, bit by bit. This includes the port parameter bits as well as the assigned port priority number bits. The bit values of each contending port are compared in a prescribed order to the corresponding bus digit value. A unit is removed from bus contention if, on any digit comparison, a prescribed result is obtained indicating that another port of higher priority is requesting access. In the disclosed embodiment of the invention, the priority for bus access is based on the magnitude of the number defined by parameter bits and the priority number bits in each port's shift register. In the disclosed embodiment a wire OR TTL bus is used in which a 1 represents the dominant low voltage state.

Further, in accordance with my invention, I provide increased flexibility in determining port preference by the provision of a mask bus. The mask bus is effective when activated by a system controller to cause the arbitration circuitry of each port to ignore, selectively, any or all of the parameter bits during contention time.

The mask signal temporarily disables circuitry internal to each port and causes bus access to be determined by the assigned port priority number plus any of the parameter bits that are not masked. As the same time, the mask circuitry permits all bits, including the masked parameter bits, to be applied to the arbitration bus during contention time. The bits on the bus can be used by other system facilities, such as recording facilities, to monitor system status and to determine the effectiveness of the parameter bits.

This masking is a desirable feature since under certain system conditions it may be desirable to disregard one or more parameter bits in determining bus access. The invention implements the mask bus feature in a fault tolerant manner which prevents the mask bus from masking the assigned port priority bits. This ensures that a unique port will always be selected in the event of a trouble condition that permanently applies a mask signal to the mask bus.

I also provide an enable/disable bus that includes a conductor unique to each port and extending from a system controller to the port. The conductor is connected to circuitry within each port which effectively disables the port and prevents it from bidding for bus access. This feature is useful in connection with circuit malfunctions that might possibly cause a port to consistently apply all 1's to the bus during arbitration time and therefore monopolize the bus access.

In a packet switch, packets are stored in a buffer memory in the ports; the port contention logic competes for access to the common resources including typically a common packet transfer bus herein termed a data bus. A packet will be lost if it is transmitted to a port which already has one or more packets in its buffer memory and does not have enough room to store another packet. The rate of packet loss can be made small by providing enough memory in each port so that on a statistical basis the packet loss rate will be acceptable at the traffic limit of the switch. My invention makes it possible to design the packet switch so that smaller memories are required to give the same packet loss rate at a given amount of network traffic; or that with a fixed amount of memory, the packet loss rate will be smaller for a given amount of traffic. Since most of the cost and complexity of the switch is typically contained in the memory or queue of the ports, the port contention logic can be expanded considerably and still reduce the cost and complexity of the system since the capabilities of my invention make possible significant cost and complexity reductions in the memory. This invention provides means for making the switch's arbitration algorithm sensitive to the dynamic state of the ports as well as means for altering the parameters to which the algorithm is sensitive to on a frame-by-frame basis. This is accomplished by fault tolerant means without sacrificing the distributed nature of the arbitration means.

The above described arrangement overcomes the disadvantage of the prior art in that it provides increased flexibility and a more optimal allocation of ports for access to a facility or bus in systems in which each port is assigned a fixed priority number whose magnitude would otherwise determine the bus access priority.

BRIEF DESCRIPTION OF THE DRAWINGS

The foregoing and other advantages of my invention will be apparent from the following detailed description of an exemplary embodiment thereof, when read in conjunction with the accompanying drawing, in which.

DETAILED DESCRIPTION

Figure 1:
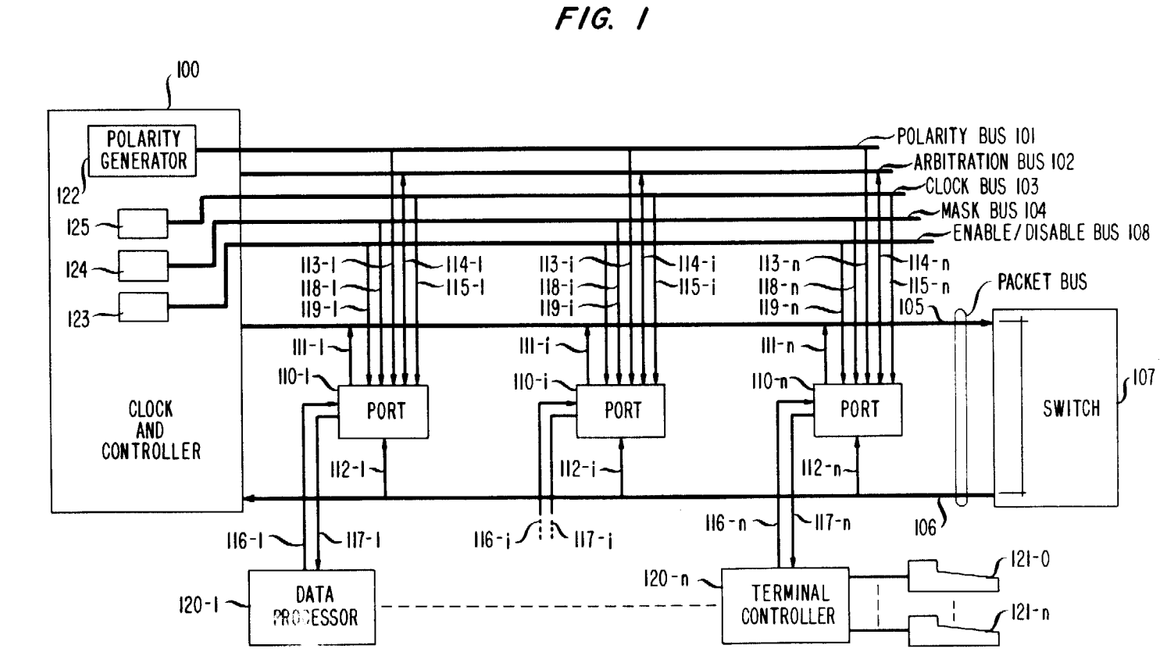
FIG. 1 is a simplified block diagram illustrating the components of a typical system in which my invention may be utilized.

FIG. 1 discloses a packet switching system embodying the present invention. On FIG. 1 is disclosed a controller 100, having a polarity generator 122, ports 110-1 through 110-n, switch 107, and a plurality of busses interconnecting the controller 100 with the ports 110. These busses include packet busses 105 and 106 which receive the data applied from the output data 111 of each port directed to another port. Packet bus 106 receives this data after it has been extended through switch 107 and applies it to the input 112 of each port. Clock bus 103 extends the signals shown on FIG. 3 from the controller to the ports. Arbitration bus 102 concurrently receives the corresponding priority bits applied sequentially by each requesting port during bus contention time. Polarity conductor 101 applies a potential from controller 100 to the ports 110 at selected times to cause them to apply to bus 102 the inverse of any digit of their assigned priority number.

The enable/disable bus 108 includes a conductor unique to each port and extends from the controller 100 to each port 110. The bus is effective when activated to cause the associated port to be removed from service and to deny it access to the arbitration bus 102 and the packet busses 105 and 106. The mask bus 104 comprises a conductor common to all ports and extends from the controller 100 to the ports. It is effective when activated to cause any combination of the port parameter bits to be disregarded during contention time so that bus access is awarded on the basis of the remaining parameter bits, if any, and the priority number assigned to each port.

Data processor 120-1 and terminal controller 120-n, together with terminals 121, are illustrative of the type of facilities that may be served by the ports. As is typical in packet switching, a transmitting port that obtains access to the packet bus 105 transmits whatever data may be desired over packet bus 105, through switch 107, and over packet bus 106 to the input 112 of the port to which the information is directed.

Figure 2:
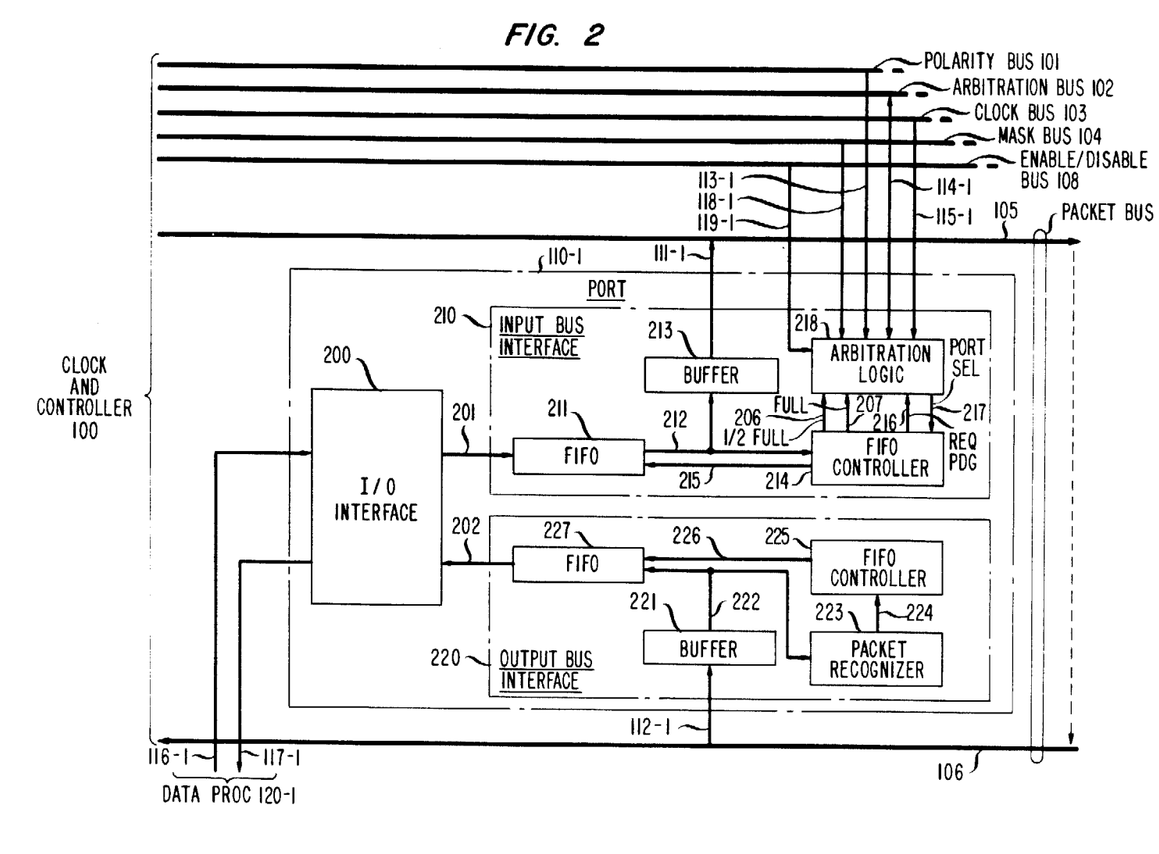
FIG. 2 discloses further details of the port circuit of FIG. 1.

FIG. 2 discloses further details of the ports 110 of FIG. 1. Each port includes an I/O interface 200, an input bus interface 210 and an output bus interface 220. The input bus interface 210 includes arbitration logic 218 and buffer 213 which applies data to the packet bus 105. Interface 210 further includes a FIFO 211, and a FIFO controller 214. The FIFO receives packet information from interface 200 and temporarily stores it until it is read out and extended through the buffer to packet bus 105. The FIFO controller 214 receives information over path 212 from the FIFO with length information such as bits specifying whether the FIFO is currently at least half-full or full. The controller passes this information over paths 206 and 207 to the arbitration logic 218 which uses this information as additional parameter bits for contention purposes.

Output bus interface 220 contains the circuitry by which the port receives information from packet bus 106. This circuitry includes buffer 221, FIFO 227, FIFO controller 225, and packet recognizer 223.

Typically, the data processor 120 served by the port of FIG. 2 applies a packet of information to be sent to another port over path 116-1, through I/O interface 200 and over path 201 to FIFO 211. The FIFO controller 214 detects the receipt of a complete packet by FIFO 211, transmits a request for bus access to arbitration logic 218 which then functions during the next contention interval to attempt to obtain access for the port to bus 105. Upon obtaining such access, FIFO controller 214 causes FIFO 211 to apply the packet information it contains via buffer 213 to packet bus 105. This information includes header information identifying the port to which the packet is being sent. After passing through the switch 107 on FIG. 1, the information is applied over packet bus 106, to path 112 of the receiving port, and via its buffer 221 to its FIFO 227 and its packet recognizer 223. Element 223 detects that the information now in FIFO 227 is indeed directed to this port and then, by means of FIFO controller 225, causes FIFO 227 to output the information via path 202, I/O interface 200, and over path 117 to the device served by the receiving port.

Figure 3:
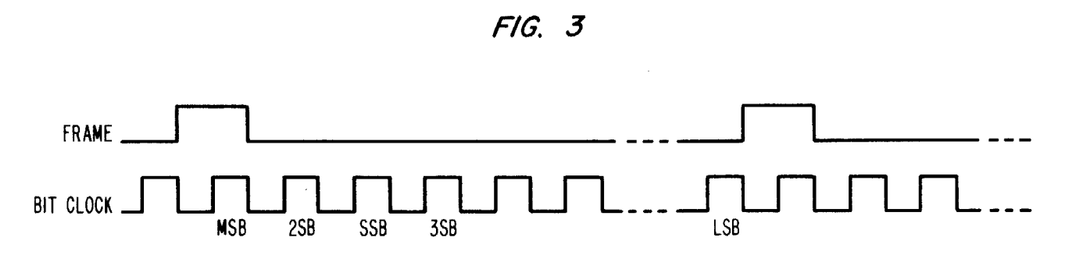
FIG. 3 is a timing diagram.

FIG. 3 discloses the waveforms of the timing and control signals applied over clock bus 103 to the ports. The top signal is a positive frame pulse and identifies the beginning of each frame. A bus contention interval begins with each frame pulse. This frame is as long as required for an entire packet to be transmitted. The bus contention logic and the packet transmission can occur simultaneously during each frame, with the port which wins a contention cycle controlling the packet bus 105 during the next frame. The lower signal is the bit clock signal and it is used for a number of control purposes during the contention or arbitration interval.

Figure 4:
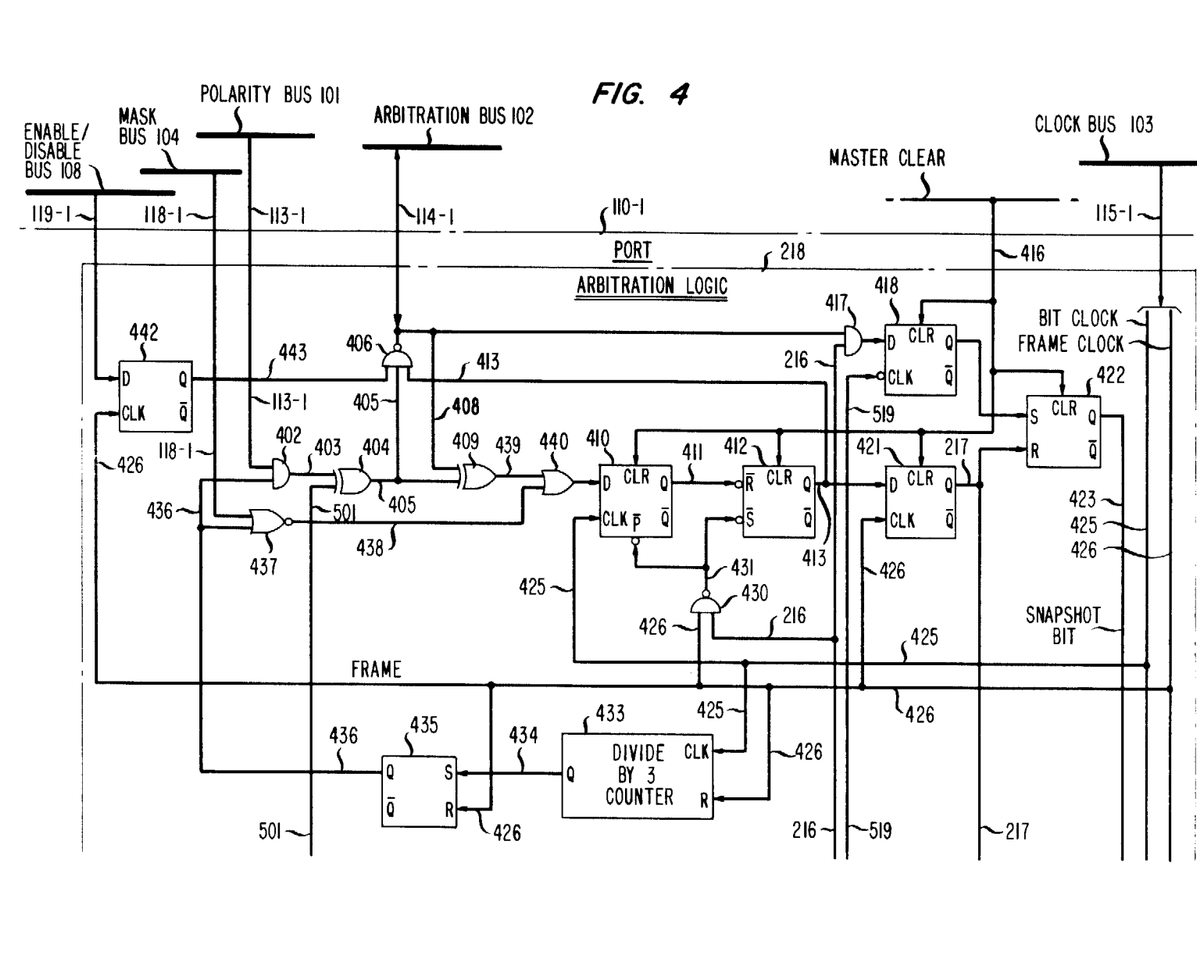
FIGS. 4 and 5 disclose the circuit details of the arbitration logic of the port of FIG. 2.
Figure 5:
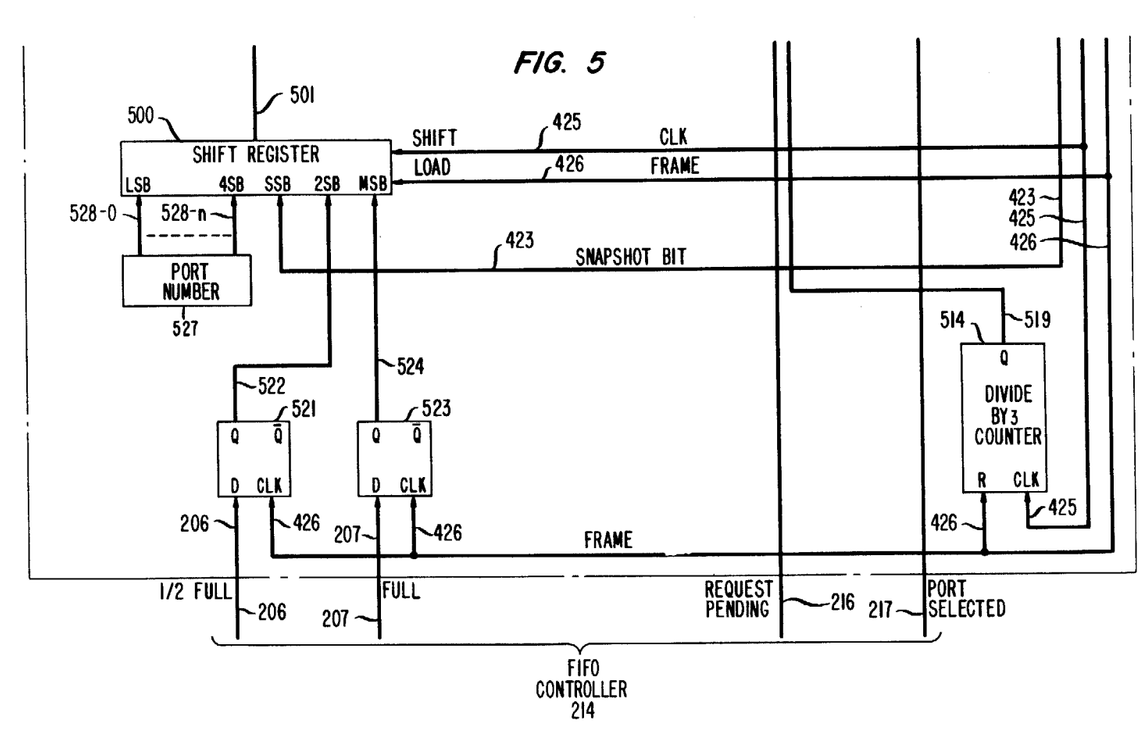
Figure 6:
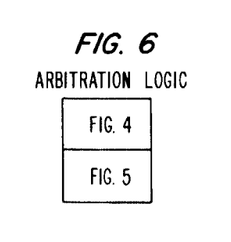
FIG. 6 discloses how FIGS. 4 and 5 should be arranged with respect to each other.

The detailed embodiment of the arbitration logic 218 of FIG. 2 is illustrated in FIGS. 4 and 5. This circuitry implements additional priority code bits and an enable/-disable bus or mask bus that causes each requesting port to ignore any status bits on the arbitration bus when the disable potential is applied.

During the basic arbitration cycle, the hard-wired assigned port number in element 527 is loaded into parallel-in, serial-out shift register 500 over path 528. The FRAME CLOCK pulse is passed to the LOAD input of shift register 500 over path 426. When the FRAME CLOCK goes high, all bits of the assigned port number are loaded into shift register 500 in parallel. Assume at this time that the signals for the full bit (path 524) half-full bit (path 522) and the snapshot bit (path 423) applied to shift register 500 are LO (and will be discussed later).

When the port is first powered up, flip-flops 410, 412, 418, 421 and 422 are reset by the MASTER CLEAR signal input to their respective CLR inputs on path 416. Their respective Q outputs are LO when these flip-flops are reset.

When a REQUEST PENDING signal 216 is present from FIFO controller 214 as the port requests bus access, a HI is passed over path 216 to the right input of NAND gate 430 and the lower input of AND gate 417. This HI enables these gates. When the next FRAME CLOCK goes HI on path 426, the output of NAND gate 430 goes LO. The LO output of NAND gate 430 is passed over path 431 to the active LO preset input of D flip-flop 410, and to the active LO set input of SR flip-flop 412. This LO input sets both flip-flops and causes their Q outputs to go HI. The HI Q output from SR flip-flop 412 is passed over path 413 to partially enable the 3-input NAND gate 406. This high also enables the D input of D flip-flop 421.

All the bits in the shift register are now serially shifted out of the shift register one bit at a time with each pulse of the bit clock, over path 501, to the lower input of exclusive OR gate 404. Assume at this time that the upper input to exclusive OR gate 404 is LO so that signals on the lower input over path 501 pass unchanged through gate 404 to path 405. The output from exclusive OR gate 404 is passed over path 405 to the center input of NAND gate 406 and to the lower input of exclusive OR gate 409. The right and left inputs of NAND gate 406 are currently enabled and therefore the bits applied to its center input are inverted and passed over path 407 to arbitration bus 102.

The logical union of the priority bits applied by all requesting ports to bus 102 is applied from bus 102 to the top input of exclusive OR gate 409 over path 408 as well as the top input of gate 417. Exclusive OR gate 409 compares the current digit value of arbitration bus 102 with the value of the digit this port puts on the bus. If there is a mismatch, the inputs to exclusive OR gate 409 will match and the output of exclusive OR gate 409 goes LO. A mismatch is said to exist when the port attempts to apply a high to the bus as an 0 at the output of gate 406 at a time when the bus is driven LO when at least one other port applies a 1 to the bus from the output of its gate 406. Thus, when such a mismatch exists, the lower input of gate 409 is LO from the 0 from the shift register of the current port; the upper input of the gate is also LO from the 1 applied in inverted form to the bus 102 by the gate 406 of another port. This causes gate 409 to generate a LO as a mismatch signal. This means that the port applying a 1 has higher priority and that the port applying an 0 should remove itself from contention.

The LO mismatch signal from exclusive OR gate 409 is passed over path 439, through gate 440, to the D input of D flip-flop 410. At the beginning of the next bit clock pulse, the Q output of D flip-flop 410 is made LO and this LO is passed over path 411 to the active LO R input of RS flip-flop 412. This LO resets RS flip-flop 412. The resulting LO output at Q of RS flip-flop 412 is passed over path 413 to the right input of NAND gate 406. This LO effectively removes NAND gate 406 from bus 102 by disabling its right hand input. Thus, the port of FIGS. 4 and 5 will have failed to win the arbitration under the above assumed conditions. Let it now be assumed that a mismatch is not detected. The output of exclusive OR gate 409 remains HI as each digit is applied since the two inputs to the gate do not match. This HI output is passed over path 439 to the D input of D flip-flop 410. This HI input causes its Q output to remain HI over path 411 to the LO reset input of SR flip-flop 412. This LO to HI transition on the LO reset input of SR flip-flop 412 does not reset this flip-flop and therefore, its Q output remains HI. The Q output from SR flip-flop 412 is passed over path 413 to input of NAND gate 406. This allows the NAND gate to continue to pass the priority bits to arbitration bus 102 and keeping the port in contention.

A port wins the arbitration for bus 102 when a mismatch condition is not detected by its exclusive OR gate 409. This causes Q outputs of flip-flops 410 and 412 to remain HI. The HI Q output from SR flip-flop 412 is passed to the D input of D flip-flop 421 over path 413. The HI signal of the next FRAME CLOCK pulse sets the Q output of D flip-flop 421 HI. The HI output from Q of D flip-flop 421 is passed as a PORT SELECTED signal on path 217. The PORT SELECTED signal is also passed to the R input of SR flip-flop 422 to reset its Q output LO. This LO Q output from SR flip-flop 422 is passed over path 423 to the shift register 500 as an 0 for the SSB bit.

The present invention provides for additional priority code bits to be added to the assigned port number bits of element 527 as the most significant bits of the port's priority code during contention. These are provided by flip-flops 521 and 523 which operate when a "FULL" or "HALF-FULL" condition is detected by FIFO controller 214. When the FIFO controller 214 determines that FIFO 211 is at least half full, a HI one-half FULL signal is passed over path 206 from FIFO controller 214 to the D input of D flip-flop 521. The HI transition of the first FRAME CLOCK on the CLK input of flip-flop 521 over path 426 sets the flip-flop to cause its Q output to go HI. The HI Q output of D flip-flop 521 is passed over path 522 to the 2SB input of shift register 500. The delay in flip-flop 521 allows for the same clock edge of the FRAME CLOCK to clock both flip-flop 521 and shift register 500 with no race condition.

When FIFO controller 214 determines that FIFO 211 is full, a HI FULL signal is passed on path 207 from FIFO controller 214 to the D input of D flip-flop 523. The LO to HI transition of the next FRAME CLOCK pulse on the CLK input of flip-flop 523 sets the flip-flop to cause its Q output to go HI. The HI Q output of flip-flop 523 is passed over path 524 to the MSB input of shift register 500. The delay in flip-flop 523 allows for the same clock edge of the FRAME CLOCK to clock both flip-flop 523 and shift register 500 with no race condition.

Bits from flip-flops 521 and 523 change the priority for port arbitration based on a full or one-half full determination. These bits are then loaded into shift register 500 along with the snapshot bit on path 423 and the assigned hard-wired port number 527 over path 528.

The snapshot bit is set to a 1 by divide-by-3 counter 514 if no other port is applying a 1 as a snapshot bit to arbitration bus 102 at the time the SSB bit is read out of the shift register and applied to bus 102. The bus is HI at that time since all ports are applying an 0. Divide-by-3 counter 514 is reset by each FRAME pulse and counts the subsequent bit clock pulses that are applied to its CLK input on path 425.

In order for the rising edge of the pulse generated by the divide-by-3 counter 514 to correctly clock the snapshot bit into flip-flop 418, care must be taken for the particular combination of parts selected that the snapshot signal will still be stable at the D input of flip-flop 418 when the clock pulse comes from counter 514. A potential race condition exists here because the same rising edge of the bit clock which causes the arbitration logic to put the next bit out on arbitration bus 102 also clocks counter 514. For most implementations, a worst case timing analysis would show that the delay caused by shift register 500, gate 404, bus driver gate 406, the capacitance of arbitration bus 102, and gate 417 is much greater than the delay through counter 514 and hence no race condition would exit. If for a particular choice of logic parts a race problem exists, then a delay element inserted between gate 417 and the D input of flip-flop 418 would eliminate the problem. The SSB bits present on arbitration bus 102 represent an 0 and are applied as a HI to the upper input of AND gate 417. Since D flip-flop 418 is only clocked by the third bit clock pulse from divide-by-3 counter 514, the Q output of this flip-flop can be set HI only if the output of AND gate 417 is HI at this time. The output of AND gate 417 is HI at bit clock 3 time only if there are no snapshot bits of 1 present on arbitration bus 102 and if this port has an active HI REQUEST PENDING signal on path 216. In this case, a HI signal is applied over path 114-1 through gate 417 to set flip-flop 418 when it is clocked by counter 514. The HI Q output of D flip-flop 418 is passed to the Set input of SR flip-flop 422 over path 419 to set its Q output HI. This HI output is passed as a 1 to the SSB input of shift register 500 over path 423. The snapshot bit is then loaded into shift register 500 by the LO to HI transition of the next FRAME CLOCK.

All the bits in parallel-in, serial-out shift register 500 are subsequently shifted out of the shift register one bit at a time with each pulse of the bit clock over path 501 to exclusive OR gate 404. With the upper input of gate 404 LO, the bits are passed unchanged by exclusive OR gate 404. Counter 433 and flip-flop 435 are added to count bit clock pulses and to prevent a signal on the polarity bus 101 from being effective to invert the first 3 priority bits (full, half-full, and snapshot bits) and to allow a signal on the polarity bus 101 to invert only the assigned port address bits received from element 527. A signal on the mask bus 104 is allowed to mask only the snapshot bits, and full and one-half full bits.

Counter 433 and SR flip-flop 435 are reset when the FRAME CLOCK pulse is HI over path 426. This causes a LO output at the Q output of SR flip-flop 435. This LO is passed over path 436 to AND gate 402 on its lower input and to NOR gate 437 on its lower input. With its lower input LO, the output of NOR gate 437 inverts a LO mask signal applied to the upper input of the gate from the mask bus 104 over path 118-1. The inverted mask bus signal is then applied as a HI over path 438 to the lower input of OR gate 440. This institutes a mask signal and prevents the port from removing itself from contention during the time of the first three bits since the HI on gate 440 prevents flip-flop 410 from being reset. However the MSB, 2SB, and SSB bits are still applied to bus 102 so that other system facilities can use them for status recording or any other purposes that may be desired.

The LO input to AND gate 402 from the Q output of flip-flop 435 after the first three bit periods disable the AND gate and prevents it from passing a polarity reversal signal received from the polarity bus 101 over path 113-1. The resulting LO output from AND gate 402 is applied over path 403 to exclusive OR gate 404. This permits the other input from shift register 500 over path 501 to pass unchanged through exclusive OR gate 404 over path 405 to the center input of 3-input NAND gate 406 and to exclusive OR gate 409.

The divide-by-3 counter 433 is incremented as each bit is shifted out of shift register 500 by the BIT CLOCK. When three bit clock pulses have been counted, the first three bits (full, one-half full and snapshot) have been shifted out of shift register 500 and the divide-by-3 counter 433 sets it output HI over path 434 to SR flip-flop 435. SR flip-flop 435 is set HI at its S input and sets its Q output HI. The HI output from SR flip-flop 435 is applied to AND gate 402 and NOR gate 437. The HI input to NOR gate 437 is inverted to a LO. This prevents a LO mask bus signal 104 on path 118-1 from being passed through NOR gate 437. The LO output from NOR gate 437 is passed to OR gate 440 on path 438. The HI from SR flip-flop 435 over path 436 partially enables AND gate 402. This allows the polarity bus 101 to apply a HI reversal signal over path 113-1 through AND gate 402 to exclusive OR gate 404.

If the polarity bus signal and the port number bits from the shift register 500 are both HI at the input to exclusive OR gate 404, then the output will be LO. If the input signals from the polarity bus and the port numbers are different, the output will be HI. Thus a LO signal from polarity bus 101 allows any port number bit to pass through exclusive OR gate 404 unchanged. A HI signal input from the polarity bus inverts any port number bit extended through exclusive OR gate 404 if the Q output of flip-flop 435 is also high. The output from exclusive OR gate 404 is again passed to the center input of 3-input NAND gate 406 and to exclusive OR gate 409 over path 405.

The left input of 3-input NAND gate 406 is normally enabled over path 443 by flip-flop 442. D flip-flop 442 can either enable or disable the port arbitration logic synchronously with the frame clock at the beginning of a frame. With a HI on path 119, D flip-flop 442 is set HI by the FRAME CLOCK pulse over the path 426. The HI output at Q is passed to AND gate 406 on path 443 to partially enable the gate. Flip-flop 442 remains set with its Q output HI unless a low PORT DISABLE signal is received on bus 108 and over path 119-1 to disable this port.

The right input to 3-input NAND gate 406 is enabled over path 413 as discussed previously. NAND gate 406 is thus enabled and the middle input signal is inverted and passed over path 407 as priority bits to the arbitration bus 102. The priority bits are applied from arbitration bus 102 to exclusive OR gate 409 and to gate 417. Exclusive OR gate 409 compares the digit value of what is on arbitration bus 102 with the value of each digit this port puts on the bus. If there is a mismatch, the inputs to exclusive OR gate 409 are then identical and the output of exclusive gate 409 goes LO. A mismatch is detected when the bus signal is a 1 (LO) and the port signal is an 0 (HI). The LO output from exclusive OR gate 409 is passed over path 439 to OR gate 440. This LO signal is passed to the D input of D flip-flop 410. This resets flip-flops 410 and 412 and disables gate 406 to remove the port from contention.

If the inputs to exclusive OR gate 409 are not identical, the output of exclusive OR gate 409 remains HI. This HI output is passed over path 439 to OR gate 440. The HI input to OR gate 440 causes a HI output and therefore a HI input to D on D flip-flop 410. At the D input of D flip-flop 410, the basic arbitration cycle continues to completion as discussed previously.

What is claimed is:

1. In a system for allocating access to a demand-shared facility among a plurality of units wherein each unit has an assigned unique n digit priority number for determining facility access during concurrent requests by said units, said system comprising;

an arbitration bus interconnecting all of said units, means in each of said units for requesting access to said demand-shared facility, a plurality of multistate logic devices in each of said units, means for selectively and combinationally switching said logic devices from a first to a second state in each of said units under control of specified parameters representing the current dynamic state of said units, a system controller for controlling said means for switching said logic devices, means for forming a dynamic priority number for each of said units by applying the outputs of said logic devices as parameter digits to the more significant digit positions of said dynamic number and by applying the digits of said assigned priority number to the lesser significant positions of said dynamic number, a mask bus interconnecting said units, means for applying a mask signal at selected times to said mask bus, means in each of said units currently requesting access to said demand-shared facility for concurrently superimposing the corresponding digits of the associated dynamic priority number onto said arbitration bus sequentially digit by digit, means for comparing the digit values on said bus with the corresponding digit values applied by each of said requesting units, means in each unit responsive when said mask signal is extant on said mask bus for disabling said comparing means so that said parameter digits superimposed on said bus are not used in determining unit access, and means for removing from facility access contention a requesting one of said units upon the detection of a prescribed comparison result between a bus digit value and the corresponding digit value applied by said unit, said disabling means being effective so that said preference for facility access between said concurrently requesting units is determined by any parameter digits whose comparison is not disabled and by the applied digits of said assigned priority numbers of said requesting units.

2. The system of claim 1 wherein said means for switching said logic devices comprises;

a buffer memory in each unit, means for monitoring the buffer memory in each unit to determine whether it is less than X percent full or X percent full or full of information to be applied by said unit to said facility, means for switching from a first to second state a first one of said logic devices in each unit when said buffer of said unit is at least X percent full, means for switching from a first to a second state a second one of said logic devices of a unit when said last named unit's buffer is full, and means for applying outputs of said set logic devices as parameter digits to said facility as the more significant digits of said dynamic priority number.

3. The system of claim 2 wherein said means for switching said logic devices further comprises;

means in each unit and controlled by said controller for defining a snapshot time occurrence, means in each unit for recording a facility access request extant during a snapshot time occurrence, said last named means including means for switching a third one of said logic devies from a first to a second state in each unit having a service request extant during a snapshot time occurrence, means in each unit having said third logic device in a second state for generating a snapshot bit as one of said parameter bits of said unit's dynamic priority number.

4. The system of claim 1 or 3 in combination with means for preventing the disabling of said comparing means by a mask signal whenever the digits of said assigned priority number of a unit are superimposed on said arbitration bus.

5. In a system for allocating access to a demand-shared data bus among a plurality of ports wherein each port has an assigned unique n bit priority number for determining bus access during concurrent requests by said ports, said system comprising;

an arbitration bus interconnecting all of said ports, clock means for applying clock signals to said ports, means in each of said ports for generating a signal requesting access to said data bus, a plurality of flip-flops in each of said ports, means for selectively and combinationally switching said flip-flops from a first to a second state in each of said ports in accordance with specified parameters representing the current dynamic state of said ports, a system controller for controlling said means for switching said logic devices, a shift register in each port, means for forming a dynamic priority number for each of said ports by applying the outputs of said flip-flops as port parameter bits to the more significant bit positions of said port's shift register and by applying the bits of each port's assigned priority number to the lesser significant bit positions of said port's shift register, a mask bus interconnecting said ports, means for applying a mask signal at selected times to said mask bus, means responsive to said request signal and controlled by said clock signals for reading out sequentially the bits in the shift register of each requesting port, a first gate means in each port for receiving said port priority number digits outpulsed under control of said clock signals from said shift register sequentially digit by digit in order of most significant digit to least significant digit, bi-state means in each port controlled by said clock signals and responsive to a data bus access request signal for enabling said first gate means so that said digits representing said port's dynamic priority number are outpulsed from said shift register sequentially and applied to said arbitration bus in synchronism with the application of corresponding digits to said arbitration bus by other of said ports currently requesting access to said data bus, comparison gate means in each port connected to said arbitration bus and to said shift register in each port for comparing each digit value on said arbitration bus to the digit value concurrently applied to said arbitration bus from said shift register of said port, means in each port responsive when said mask signal is extant on said mask bus for disabling said comparing means so that said parameter bits concurrently on said arbitration bus are not used in determining data bus access, and second gate means in each port controlled by said comparison gate means for deactivating said enabling means whenever any digit value on said arbitration bus has a higher priority than the corresponding digit applied to said arbitration bus from said shift register of said port, said disabling means being effective so that said preference for data bus access between said requesting ports is determined by any parameter bits applied when said comparing means is not disabled and by the applied bits of said assigned priority numbers of said requesting ports.

6. The system of claim 5 in combination with a buffer memory in each of said ports and wherein said means for switching said flip-flops comprises;
   means for monitoring the buffer memory in each port to determine whether it is less than X percent full or X percent full or full of information to be applied by said port to said data bus,
   means for switching from a first to second state a first one of said flip-flops in each port when said buffer is at least X percent full,
   means for switching from a first to a second state a second one of said flip-flops of a port when said port's buffer is full, and
   means for applying outputs of said set flip-flops as parameter bits to said arbitration bus as the more significant bits of said dynamic priority number.

7. The system of claim 6 in combination with, means in each port and controlled by said controller for defining a snapshot time occurrence and wherein said means for switching said flip-flops further comprises;
   means in each port for recording a data bus access request extant during a snapshot time occurrence,
   said last named means including means for setting a third one of said flip-flops from a first to a second state in each port having a service request extant during a snapshot time occurrence, and
   means in each port having said third flip-flop in a second state for generating a snapshot bit as one of said parameter bits of said port's dynamic priority number.

8. The system of claim 5 or 7 in combination with means for preventing the disabling of said comparison gate means by a mask signal on said mask bus when the bits of said assigned priority number of a port are applied to said arbitration bus.

9. A method of allocating access to a demand-shared facility among a plurality of units wherein each unit has a unique assigned n digit priority number for determining facility access when a plurality of units are concurrently requesting access, said method comprising the steps of;
   (1) combinationally setting multistate logic devices in each unit to represent the current dynamic status of specified unit parameters,
   (2) forming in each unit a dynamic unit priority number having digits generated by said devices and representing said unit's parameters in its more significant digit positions and having the digits of said unit's assigned priority number in its lesser significant digit positions,
   (3) interconnecting said units with a mask bus and an arbitration bus,
   (4) applying a mask signal at selected times to said mask bus,
   (5) concurrently superimposing on said arbitration bus, sequentially digit by digit, the corresponding digits of the dynamic priority number of each of said units currently requesting facility access,
   (6) sequentially comparing the digit values on said arbitration bus to the corresponding digit values applied by each of said requesting units, and
   (7) inhibiting said comparison of said parameter digits superimposed said bus when a mask signal is concurrently extant on said mask bus so that said preference between said requesting units for facility access is determined by any of said parameter digits whose comparison is not inhibited and the digits of said assigned priority numbers,
   (8) removing from facility access contention any requesting one of said units upon the detection of a prescribed comparison result between the arbitration bus digit value and the value of the corresponding digit then applied by said one unit, and
   (9) granting facility access to the unit remaining in contention after all if its dynamic priority number digits have been applied to said arbitration bus.

10. The method of claim 9 wherein some of said parameter digits in each requesting unit are generated by the steps of;
    (1) monitoring a buffer memory in said unit to determine whether it is less than X percent full or X percent full or full of information waiting to be applied by said unit to said facility,
    (2) switching from a first to second state a first one of said logic devices of a unit when said unit's memory is at least X percent full,
    (3) switching from a first to a second state a second one of said logic devices of a unit when said unit's memory is full, and
    (4) applying outputs of said logic device's as parameter digits to said arbitration bus as the more significant digits of said requesting unit's dynamic priority number.

11. The method of claim 10 wherein at least one of said parameter digits in each requesting unit is generated by the steps of;
    (1) defining a snapshot time,
    (2) switching from a first to second state a third one of said logic device in each unit requesting access during the occurrence of said snap-shot time,
    (3) applying a snap-shot digit to said bus as one of said parameter digits in each unit requesting access during said snap-shot time, and
    (4) switching from a second to a first state the logic device in each unit subsequently granted access to said facility while applying said snap-shot bit to said bus.

12. The method of claim 9 or 11 in combination with the step of preventing the inhibiting of the comparison of said assigned priority number digits whenever a mask signal is extant on said mask bus concurrently with the superimposing of said assigned priority digits on said arbitration bus.

13. A method of allocating access to a demand-shared data bus among a plurality of ports wherein each port has a unique assigned n digit priority number for determining data bus access when a plurality of ports are concurrently requesting access, said method comprising the steps of;
    (1) combinationally setting flip-flops in each port to represent the current dynamic status of specified port parameters,
    (2) forming in each port a dynamic port priority number by entering bits from said flip-flops representing said port's parameters in the more significant bit positions of a port shift register and by entering the bits of each port's assigned priority number in the lesser significant bit positions of the port shift register,
    (3) applying clock pulses from a controller to said ports,
    (4) interconnecting said ports with a mask bus and an arbitration bus, (5) applying a mask signal at selected times to said mask bus, (6) detecting a request for data bus access by a port, (7) outpulsing the dynamic priority number digits from the shift register of a requesting port under control of said clock pulses, (8) concurrently superimposing on said arbitration bus, sequentially bit by bit, the corresponding digits of the dynamic priority number outpulsed from the shift register of each of said units currently requesting facility access, (9) sequentially comparing the digit values on said arbitration bus to the corresponding digit values applied by each of said requesting ports, and (10) inhibiting said comparison of said parameter bits superimposed said bus when a mask signal is concurrently extant on said mask bus so that said preference between said requesting ports for data bus access is determined by any of said parameter bits whose comparison is not inhibited and the bits of said assigned priority numbers, (11) removing from data bus access contention any requesting one of said ports upon the detection of a prescribed comparison result between the arbitration bus digit value and the value of the corresponding digit then applied by said one port, and (12) granting access to said data bus to the port remaining in contention after all bits of its dynamic priority number have been applied to said arbitration bus.

14. The method of claim 13 wherein some of said parameter bits in each requesting port are generated by the steps of:

(1) monitoring a buffer memory in said port to determine whether it is less than X percent full or X percent full or full of information waiting to be applied by said port to said data bus, (2) switching from a first to second state a first one of said flip-flops in each port when said memory is at least X percent full, (3) switching from a first to a second state a second one of said flip-flops of a port when said port's memory is full, and (4) applying outputs of said flip-flop's to said shift register as the more significant bits of said requesting port's dynamic priority number.

15. The method of claim 14 wherein at least one of said parameter bits in each requesting port is generated by the steps of;

(1) defining a snapshot time, (2) switching from a first to second state a third one of said flip-flops in each port requesting access during the occurrence of said snapshot time, (3) applying a snapshot bit to said shift register of each port requesting access during said snapshot time as a more significant bit of said port's dynamic priority number, and (4) switching from a second to a first state said third flip-flop in each port granted access to said data bus while applying said snapshot bit to said arbitration bus.

16. The method of claim 13 or 15 in combination with the step of preventing the inhibiting of the comparison of said assigned priority number digits whenever a mask signal is extant on said mask bus concurrently with the superimposing of said assigned priority digits on said arbitration bus.

17. The method of claim 16 in which the step of preventing said inhibiting comprises the steps of;

(1) counting the number of digits that are outpulsed from the shift register of a requesting port, (2) switching a logic means from a first to a second state when all of said parameter bits of a requesting port have been outpulses from the shift register of said port.

* * * * *